(12) United States Patent
Chng et al.

(10) Patent No.: US 11,367,458 B2
(45) Date of Patent: Jun. 21, 2022

(54) ACCELEROMETER INSIDE OF A MICROPHONE UNIT

(71) Applicant: WAYMO LLC, Mountain View, CA (US)

(72) Inventors: Choon Ping Chng, Los Altos, CA (US); Cheng-Han Wu, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/999,912

(22) Filed: Aug. 21, 2020

(65) Prior Publication Data

US 2022/0059118 A1 Feb. 24, 2022

(51) Int. Cl.
| | | |
|---|---|---|
| *G10L 25/51* | (2013.01) | |
| *G01P 15/09* | (2006.01) | |
| *G10K 11/178* | (2006.01) | |
| *H04R 1/08* | (2006.01) | |
| *H04R 1/40* | (2006.01) | |
| *B60R 11/02* | (2006.01) | |

(Continued)

(52) U.S. Cl.
CPC ............ *G10L 25/51* (2013.01); *B60R 11/02* (2013.01); *G01P 15/0907* (2013.01); *G10K 11/17873* (2018.01); *H04R 1/08* (2013.01); *H04R 1/406* (2013.01); *H04R 3/005* (2013.01); *B60R 2011/004* (2013.01); *G10K 2210/12821* (2013.01); *G10K 2210/3027* (2013.01); *H04R 2499/13* (2013.01)

(58) Field of Classification Search
CPC .......... H04R 1/406; H04R 1/08; H04R 3/005; H04R 2499/13; B60R 11/02; B60R 2011/004; G10L 25/51; G10K 11/17873; G10K 2210/12821; G10K 2210/3027; G01P 15/0907

USPC ...................... 381/56, 58, 71.1, 86

See application file for complete search history.

(56) References Cited

U.S. PATENT DOCUMENTS

| | | | |
|---|---|---|---|
| 4,972,713 A | * | 11/1990 | Iwata ............... G01P 15/0922 310/329 |
| 8,436,723 B2 | | 5/2013 | Siavoshani et al. |
| 8,676,427 B1 | | 3/2014 | Ferguson et al. |

(Continued)

FOREIGN PATENT DOCUMENTS

| | | |
|---|---|---|
| CN | 111477206 A | 7/2020 |
| KR | 10-2016-0119708 A | 10/2016 |

(Continued)

OTHER PUBLICATIONS

NoiseNew, What are the 4 different types of noise, Apr. 2020, p. 1-5 (Year: 2020).*

(Continued)

*Primary Examiner* — William A Jerez Lora
(74) *Attorney, Agent, or Firm* — McDonnell Boehnen Hulbert & Berghoff LLP

(57) ABSTRACT

A system includes a microphone unit coupled to a roof of an autonomous vehicle. The microphone unit includes a microphone board having a first opening. The microphone unit also includes a first microphone positioned over the first opening and coupled to the microphone board. The microphone unit further includes an accelerometer. The system also includes a processor coupled to the microphone unit.

15 Claims, 5 Drawing Sheets

(51) Int. Cl.
*H04R 3/00* (2006.01)
*B60R 11/00* (2006.01)

(56) References Cited

U.S. PATENT DOCUMENTS

| | | | |
|---|---|---|---|
| 8,682,525 B1* | 3/2014 | Kalinadhabhotla | G07C 5/008 340/442 |
| 8,706,394 B2 | 4/2014 | Trepagnier et al. | |
| 9,327,572 B2 | 5/2016 | May | |
| 9,363,596 B2 | 6/2016 | Dusan et al. | |
| 9,507,345 B2 | 11/2016 | Takamatsu | |
| 9,661,411 B1* | 5/2017 | Han | H04R 31/006 |
| 9,824,511 B2 | 11/2017 | Valeri et al. | |
| 10,055,903 B2 | 8/2018 | Koons et al. | |
| 10,562,449 B2 | 2/2020 | Wheeler et al. | |
| 10,629,081 B2 | 4/2020 | Ghannam et al. | |
| 11,119,490 B1* | 9/2021 | Christensen | G08G 1/012 |
| 2004/0249520 A1* | 12/2004 | Maine | G01M 15/12 701/100 |
| 2006/0020416 A1* | 1/2006 | Karasek | B66B 1/3492 702/141 |
| 2007/0252725 A1* | 11/2007 | Nishida | G08G 1/0967 340/905 |
| 2012/0087521 A1* | 4/2012 | Delaus | H04R 19/005 381/174 |
| 2012/0139752 A1* | 6/2012 | Waymire | G08G 1/0965 340/902 |
| 2013/0109342 A1* | 5/2013 | Welch | H04W 4/029 455/404.2 |
| 2017/0026741 A1* | 1/2017 | Yoshino | H04R 1/406 |
| 2017/0276489 A1 | 9/2017 | Breed | |
| 2017/0323631 A1* | 11/2017 | Close | G10K 11/17881 |
| 2018/0115834 A1* | 4/2018 | Yoo | B81C 1/00166 |
| 2018/0122356 A1* | 5/2018 | Yoo | G10K 11/1787 |
| 2018/0288532 A1* | 10/2018 | Wu | H04R 19/04 |
| 2019/0049989 A1 | 2/2019 | Akotkar et al. | |
| 2019/0155285 A1* | 5/2019 | Wang | G05D 1/0055 |
| 2019/0243380 A1* | 8/2019 | Lavoie | G05D 1/0214 |
| 2020/0019170 A1 | 1/2020 | Seo et al. | |
| 2020/0043258 A1 | 2/2020 | Jiang et al. | |
| 2020/0103902 A1 | 4/2020 | Dominic | |
| 2020/0273478 A1* | 8/2020 | Park | G10L 25/51 |
| 2020/0404416 A1* | 12/2020 | Sapozhnykov | H04R 1/222 |
| 2020/0407215 A1* | 12/2020 | Zeng | B81B 7/008 |
| 2021/0210063 A1 | 7/2021 | Zhang et al. | |

FOREIGN PATENT DOCUMENTS

| | | |
|---|---|---|
| KR | 10-2019-0136818 A | 12/2019 |
| WO | 2020/041443 A1 | 2/2020 |

OTHER PUBLICATIONS

NoiseNew, What are the 4 different types of noise, Apr. 2020, p. 1-5 , year: 2000.*

The Economic Times, "Autonomous vehicles: Self-driving cars learn to navigate unknown, extreme conditions," [Online], [retrieved on Aug. 20, 2020]. Retrieved from the Internet: <URL: https://economictimes.indiatimes.com/small-biz/startups/newsbuzz/self-driving-cars-learn-to-navigate-unknown-extreme-conditions/articleshow/68610415.cms?from=mdr.>.

Sherrit, S., et al., "Microphones and Accelerometer Sensors Network for Acoustic Diagnostics (MASNAD)," Tech Briefs, Engineering Solutions for Design & Manufacturing, Apr. 1, 2015.

Aparajit Garg et al., "Emergency Vehicle Detection by Autonomous Vehicle," International Journal of Engineering Research & Technology (IJERT), vol. 8, No. 5; May 2019.

Patently Apple, "Apple invents a new Integrated Microphone and Vibration Sensor to Provide Superior Headset Noise Cancellation," [Online], [retrieved on Aug. 20, 2020], Retrieved from the Internet: <URL: https://www.patentlyapple.com/patently-apple/2017/06/apple-invents-a-new-integrated-microphone-and-vibration-sensor-to-provide-superior-headset-noise-cancellation.html>.

Qianwei Zhou et al., "Microphone-Based Vibration Sensor for UGS Applications," IEEE Transactions on Industrial Electronics, vol. 64, No. 8, pp. 6565-6572; Aug. 2017.

International Search Report and Written Opinion for PCT/US2021/042612 dated Nov. 8, 2021.

* cited by examiner

ACCELEROMETER INSIDE OF A MICROPHONE UNIT

BACKGROUND

Autonomous vehicles or vehicles operating in an autonomous mode may encounter scenarios in which maneuvers may be undertaken quickly based on unanticipated changes in a surrounding environment. As a non-limiting example, if an emergency vehicle turns on a siren, an autonomous vehicle may responsively steer to the side of the road and stop.

Typically, an autonomous vehicle uses sensors to determine its surrounding environment. For example, the autonomous vehicle could use light detection and ranging (LIDAR) devices, radio detection and ranging (RADAR) devices, and/or cameras to capture data of the environment surrounding the autonomous vehicle. However, in some instances, objects may not be readily detected by such sensors, such as when objects are outside of the fields of view of the sensors or when portions of the fields of view of the sensors are blocked (e.g., by buildings, other vehicles, vegetation, etc.). In such instances, the autonomous vehicle may not be able to determine aspects of its surrounding environment.

SUMMARY

The present disclosure generally relates to using an accelerometer in a microphone unit that is mounted on an autonomous vehicle (e.g., positioned on a roof of an autonomous vehicle) to detect low frequency vibrations.

In a first aspect, a system includes a microphone unit coupled to a roof of an autonomous vehicle. The microphone unit includes a microphone board having a first opening. The microphone unit also includes a first microphone positioned over the first opening and coupled to the microphone board. The microphone unit further includes an accelerometer. The system also includes a processor coupled to the microphone unit.

In a second aspect, a method includes receiving, at a processor, an electrical signal generated by an accelerometer. The accelerometer is included in a microphone unit that is coupled to a roof of an autonomous vehicle. The electrical signal is indicative of a waveform associated with vibrations proximate to the microphone unit that are measured by the accelerometer. The method further includes determining a cause of the vibrations based on the electrical signal.

In a third aspect, a non-transitory computer-readable medium stores instructions executable by a computing device to cause the computing device to perform functions. The functions include receiving an electrical signal generated by an accelerometer. The accelerometer is included in a microphone unit that is coupled to a roof of an autonomous vehicle. The electrical signal is indicative of a waveform associated with vibrations proximate to the microphone unit that are measured by the accelerometer. The functions also include determining a cause of the vibrations based on the electrical signal.

Other aspects, embodiments, and implementations will become apparent to those of ordinary skill in the art by reading the following detailed description, with reference where appropriate to the accompanying drawings.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. OVERVIEW

The present disclosure generally relates to using an accelerometer inside of a microphone unit that is coupled to an autonomous vehicle (e.g., coupled to a roof of an autonomous vehicle). The microphone unit can additionally include one or more microphones to detect environmental sounds, such as sirens from emergency vehicles. Advantageously, the accelerometer can detect low frequency vibrations (e.g., sounds) that may be difficult for the microphones to detect or that are a source of noise for the microphones. For example, the accelerometer can measure vibrations that are generated based on low frequency sounds, such as sirens, and generate an output voltage (e.g., an electrical signal) having a waveform that is indicative of the measured vibrations. A computing system determines sound frequencies associated with the output voltage of the accelerometer and identifies a source of the low frequency sounds based on the sound frequencies. As a non-limiting example, the computer system can determine that the source of the low frequency sound is an ambulance siren if the sound frequencies fall within the frequency range of a typical ambulance siren.

Additionally, in scenarios where the low frequency sounds correspond to noise, such as wind noise, the computing system can generate a noise cancellation signal to reduce the noise at the microphone unit. For example, upon determining the sound frequency associated with the output voltage of the accelerometer, the computing system can generate a noise cancellation signal to substantially reduce the noise at the microphone unit.

II. EXAMPLE EMBODIMENTS

Figure 1:
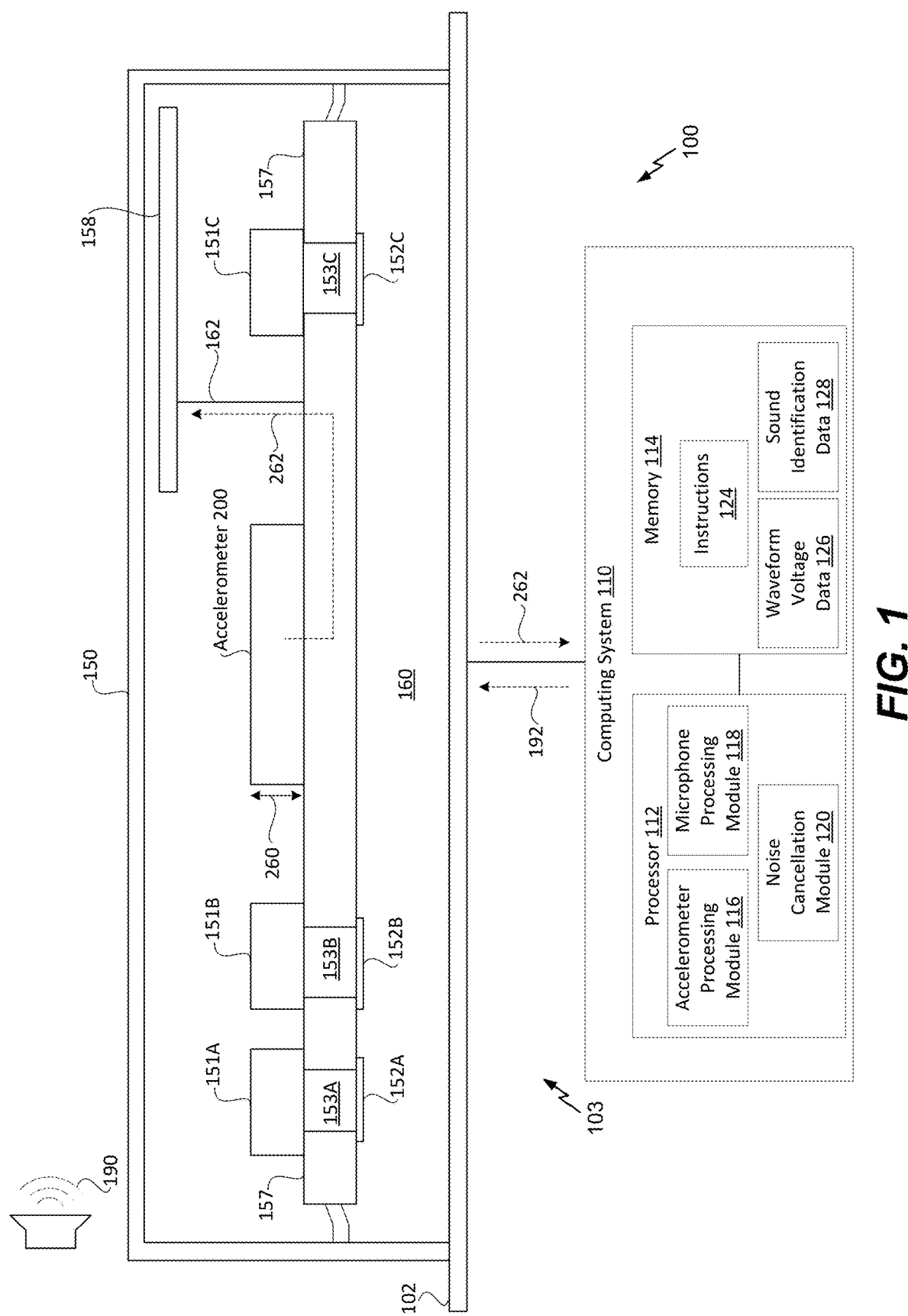
FIG. 1 is a functional diagram illustrating components of an autonomous vehicle, in accordance with an example embodiment.

FIG. 1 is a functional diagram illustrating components of an autonomous vehicle 100 in accordance with an example embodiment. The autonomous vehicle 100 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The autonomous vehicle 100 may be configured to operate fully or partially in an autonomous mode. For example, the autonomous vehicle 100 may control itself while in the autonomous mode, and may be operable to determine a current state of the autonomous vehicle 100 and its environment, determine a predicted behavior of at least one other vehicle in the environment, determine a confidence level that may correspond to a likelihood of the at least one other vehicle to perform the predicted behavior, and control the autonomous vehicle 100 based on the determined information. While in the autonomous mode, the autonomous vehicle 100 may be configured to operate without human interaction.

In FIG. 1, a roof 102 of the autonomous vehicle 100 is shown. A microphone unit 150 is coupled to the roof 102 of the autonomous vehicle 100. Although one microphone unit 150 is illustrated in FIG. 1, in other implementations, a plurality of microphone units having similar configurations as the microphone unit 150 can be coupled to the roof 102 of the autonomous vehicle 100. For example, in one implementation, three microphone units can be coupled to the roof 102 of the autonomous vehicle 100 at various locations. In another implementation, two microphone units can be coupled to the roof 102 of the autonomous vehicle 100 at various locations.

The microphone unit 150 includes a microphone board 157 that is positioned on top of fur 160. Although described as fur 160, in other implementations, other materials can be used as a means to situate the microphone board 157. The microphone board 157 has a first opening 153A, a second opening 153B, and a third opening 153C. As used herein, the microphone openings 153A-153C can also be referred to as "microphone cavities." A first microphone 151A is positioned over the first opening 153A and is coupled to the microphone board 157. The first opening 153A is sealed by a first protective vent 152A that enables air to pass through the first opening 153A. A second microphone 151B is positioned over the second opening 153B and is coupled to the microphone board 157. The second opening 153B is sealed by a second protective vent 152B that enables air to pass through the second opening 153B. A third microphone 151C is positioned over the third opening 153C and is coupled to the microphone board 157. The third opening 153C is sealed by a third protective vent 152C that enables air to pass through the third opening 153C. The microphones 151A-151C are configured to detect sounds, such as a low frequency sound 190, and generate audio frames based on the detected sounds.

Figure 2:
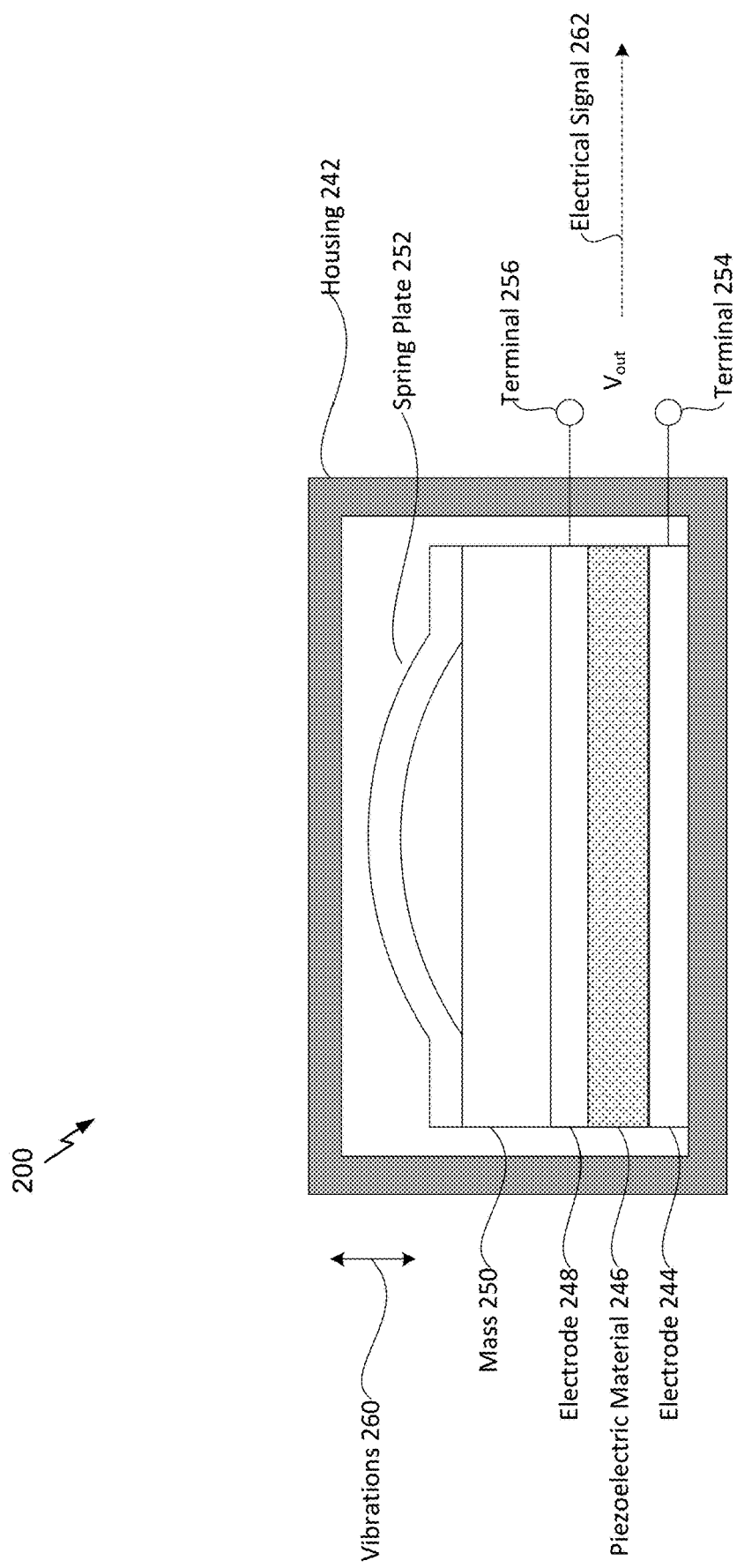
FIG. 2 is a functional diagram illustrating an accelerometer, in accordance with an example embodiment.

An accelerometer 200 is also coupled to the microphone board 157. The accelerometer 200 is configured to measure vibrations 260 proximate to the microphone unit 150 and generate an electrical signal 262 indicative of a waveform (e.g., a voltage waveform) associated with the measured vibrations 260. A non-limiting example of the accelerometer 200 is depicted in FIG. 2. For example, FIG. 2 illustrates a piezoelectric accelerometer 200 that is configured to measure the vibrations 260 proximate to the microphone unit 150. It should be understood that the techniques described herein can be implemented with a variety of different accelerometers, such as capacitance accelerometers, thermal accelerometers, gyroscopes, etc. Thus, the piezoelectric accelerometer 200 illustrated and described with respect to FIG. 2 should not be construed as limiting.

In FIG. 2, a structure of the accelerometer 200 is defined by a housing 242. The accelerometer 200 includes an electrode 244 that is positioned proximate to a bottom of the housing 242, a piezoelectric material 246 that is positioned on top of the electrode 244, and an electrode 248 that is positioned on top of the piezoelectric material 246. A mass 250 is positioned on top of the electrode 248, and a spring plate 252 is positioned on top of the mass 250.

During operation, the vibrations 260 can cause a force to be applied to the piezoelectric material 246. For example, the vibrations 260 can cause the spring plate 252 to repeatedly compress and decompress, which in turn, causes the mass 250 to apply pressure and force to the piezoelectric material 246. Based on the piezoelectric effect, the mechanical stress applied to the piezoelectric material 246 during the compression and decompression of the spring plate 252 can cause the piezoelectric material 246 to generate an electric charge that is indicative of an output voltage ($V_{out}$). For example, the output voltage ($V_{out}$) is based on a voltage difference between a terminal 254 coupled to the electrode 244 and a terminal 256 coupled to the electrode 248. The electric signal 262 is indicative of, or representative of, the output voltage ($V_{out}$).

According to some implementations, the accelerometer 200 converts the voltage difference between the terminals 254, 256 to a digital signal. For example, the accelerometer 200 can include analog-to-digital conversion registers that convert analog signals reflective of the output voltage ($V_{out}$) to digital signals that are reflective of the output voltage ($V_{out}$). According to this implementation, the electrical signal 262 can be a digital signal that is indicative of the output voltage ($V_{out}$).

Thus, the electrical signal 262 (e.g., the output voltage ($V_{out}$)) is indicative of a waveform associated with the measured vibrations 260. The vibrations 260 can be caused by one or more of a plurality of factors, such as low frequency sounds, wind noise, faulty connections associated with the autonomous vehicle 100, etc.

In example embodiments, as the sound frequency that causes the vibrations 260 increases, the output voltage ($V_{out}$) also increases. As a non-limiting example, a sound having a frequency of 100 Hertz (Hz) can result in vibrations 260 that cause the accelerometer 200 to generate an output voltage ($V_{out}$) of 5 volts, a sound having a frequency of 200 Hz can result in increased vibrations 260 that cause the accelerometer 200 to generate an output voltage ($V_{out}$) of 10 volts, etc. Thus, as described below, the output voltage ($V_{out}$) associated with the electrical signal 262 can be used to determine a frequency of surrounding sounds.

Referring back to FIG. 1, the electrical signal 262 generated by the accelerometer 200 can be transmitted to the microphone board 157, and the microphone board 157 can transmit the electrical signal 262 to a connector board 158 via a board-to-board connector 162. The electrical signal 262 can be used to determine a cause (e.g., a sound source) of the measured vibrations 260 proximate to the microphone unit 150. For example, as described below, the electrical signal 262 can be used to determine whether the vibrations 260 are caused by wind noise, other environmental noise, a faulty connection associated with the autonomous vehicle 100, etc.

The electrical signal 262 is provided to a computing system 110. For example, a bus can transmit the electrical signal 262 from the connector board 158 to the computing system 110. The bus can be a wired connection or a wireless communication medium that is used to communicate messages and signals between the microphone unit 150 and the computing system 110. As shown in FIG. 1, the computing system 110 can be integrated into a cabin 103 of the autonomous vehicle 100. For example, the computing system 110 can be integrated into a front console or a center console of the autonomous vehicle 110.

The computing system 110 includes a processor 112 that is coupled to a memory 114. The memory 114 can be a non-transitory computer-readable medium that stores instructions 124 that are executable by the processor 112. The processor 112 includes an accelerometer processing module 116, a microphone processing module 118, and a noise cancellation module 120. According to some implementations, one or more of the modules 116, 118, 120 can correspond to software (e.g., instructions 124) executable by the processor 112. According to other implementations, one or more the modules 116, 118, 120 can correspond to dedicated circuitry (e.g., application-specific integrated circuits (ASICs) or field programmable gate arrays (FPGAs)) integrated into the processor 112.

Based on the electric signal 262, the accelerometer processing module 116 is configured to determine the cause of the vibrations 260. To illustrate, the accelerometer processing module 116 can access waveform voltage data 126 from the memory 114. The waveform voltage data 126 is usable by the accelerometer processing module 116 to translate different output voltage ($V_{out}$) waveforms of the accelerometer 200 into corresponding frequency ranges. For example, the waveform voltage data 126 can indicate different sound frequency ranges for an output voltage ($V_{out}$) waveform generated by the accelerometer 200. Thus, using the waveform voltage data 126, the accelerometer processing module 116 can perform a look-up operation to identify a frequency range of a sound that results in the accelerometer 200 producing a specified output voltage ($V_{out}$).

To illustrate, the accelerometer processing module 116 can perform the look-up operation based on the output voltage ($V_{out}$) indicated by the electrical signal 262. As a non-limiting example, assume that the electrical signal 262 indicates that the waveform of the output voltage ($V_{out}$) spans from a lower-end voltage (e.g., 2.2 volts) to a higher-end voltage (e.g., 3.3 volts). The accelerometer processing module 116 can identify a frequency range, using the waveform voltage data 126, corresponding to an output voltage ($V_{out}$) waveform that spans between the lower-end voltage (e.g., 2.2 volts) and the higher-end voltage (e.g., 3.3 volts). For example, the accelerometer processing module 116 can determine that the output voltage ($V_{out}$) of the lower-end voltage corresponds to a frequency of 650 Hz and the output voltage ($V_{out}$) of the higher-end voltage corresponds to a frequency of 1000 Hz. As a result, the accelerometer processing module 116 can determine that the vibrations 260 are caused by a sound having a frequency range between 650 Hz and 1000 Hz.

The accelerometer processing module 116 can also access sound identification data 128 from the memory 128 to identify sounds using a specified frequency range. As a non-limiting example, using the sound identification data 128, the accelerometer processing module 116 can perform a look-up operation using the 650-1000 Hz frequency range to determine that firetrucks and ambulances use sirens having the corresponding frequency range. Using the above techniques, the accelerometer processing module 116 can determine that the measured vibrations 260 are caused by a fire truck siren or an ambulance siren. Thus, in the above-described example, the low frequency sound 190 external to the autonomous vehicle 100 corresponds to a siren.

It should be appreciated that the above-described techniques are not solely applicable to siren detection and can be used to identify other low frequency sounds that cause the vibrations 260 proximate to the microphone unit 150. As a non-limiting example, in other implementations, the accelerometer processing module 116 can use the above techniques to determine that the measured vibrations 260 are caused by wind noise. In this implementation, a noise cancellation signal can be generated to substantially reduce the amount of wind noise detected by the microphone unit 150. For example, the noise cancellation module 120 can generate a noise cancellation signal 192 based on the sound frequencies associated with the detected wind noise. The noise cancellation signal 192 can be transmitted to an output device (not shown) to be played out proximate to the microphone unit 150 in such a manner to reduce (e.g., cancel out) the wind noise at the microphone unit 150.

In some implementations, the noise cancellation module 120 can perform post-processing noise cancellation. For example, after noise is detected by the accelerometer 200, the microphones 151A-C, or a combination thereof, the noise cancellation module 120 can generate a noise cancellation signal (not shown) and add the noise cancellation signal to the processed noise signal to reduce (e.g., cancel) noise.

According to one implementation, the accelerometer processing module 116 is configured to monitor the electrical signal 262 over a particular distance (e.g., twenty miles, thirty miles, etc.) travelled by the autonomous vehicle 100 to determine whether there is a faulty connection associated with the autonomous vehicle 100. To illustrate, noise from a faulty connection may be substantially continuous over a travelled distance, and thus, the vibrations 260 caused by the faulty connection are typically continuous. For example, if a screw is loose somewhere proximate to the roof 102 of the autonomous vehicle 100 such that a rattling noise is present, it is likely that the rattling noise will be continuous while the autonomous vehicle 100 travels the particular distance. As another example, if one or more of the microphones 151A-151C is detecting noise because of a bad microphone connection, it is likely that the noise will be continuous while the autonomous vehicle 100 travels the particular distance. However, environmental noise surrounding the autonomous vehicle 100 may not be substantially continuous over a travelled distance because the environment typically changes. For example, the autonomous vehicle 100 can go in and out of tunnels during the travelled distance, the autonomous vehicle 100 can drive by areas that are playing loud music and then subsequently drive through quiet areas, etc.

Thus, in response to a determination that the electrical signal 262 indicates the waveform of the output voltage ($V_{out}$) is substantially continuous over the particular distance travelled by the autonomous vehicle 100, the accelerometer processing module 116 can determine that the monitored vibrations 260 are caused by a faulty connection associated with the autonomous vehicle 100. However, in response to a determination that the electrical signal 262 indicates the waveform of the output voltage ($V_{out}$) is not substantially continuous over the particular distance travelled by the autonomous vehicle 100, the accelerometer processing module 116 can determine that the monitored vibrations 260 are caused by environmental noise.

According to some implementations, the accelerometer processing module 116 determines the cause of the vibrations 260 in response to a determination that one or more of the microphones 151A-151C are not satisfactorily detecting sounds that cause the vibrations 260. For example, the microphone processing module 118 can monitor battery levels or power levels of the microphones 151A-151C. In response to a determination that the battery level of one or more of the microphones 151A-151C falls below a threshold such that the microphones 151A-151C cannot accurately detect sounds, the accelerometer processing module 116 may use the electrical signal 262 to identify sounds, as described above. Thus, the accelerometer 200 and the accelerometer processing module 116 can be used in situations where one or more of the microphones 151A-151C lack power or have failed.

The techniques described with respect to FIGS. 1-2 enable low frequency vibrations (e.g., sounds) to be detected using the accelerometer 200 in the microphone unit 150 coupled to the roof 102 of the autonomous vehicle 100. As a result, the accelerometer 200 can detect wind noise, other environmental noise, a faulty connection associated with the autonomous vehicle 100, etc. Additionally, the accelerometer 200 can be used to detect noise in scenarios where one or more of the microphones 151A-151C lack power or have failed.

Figure 3:
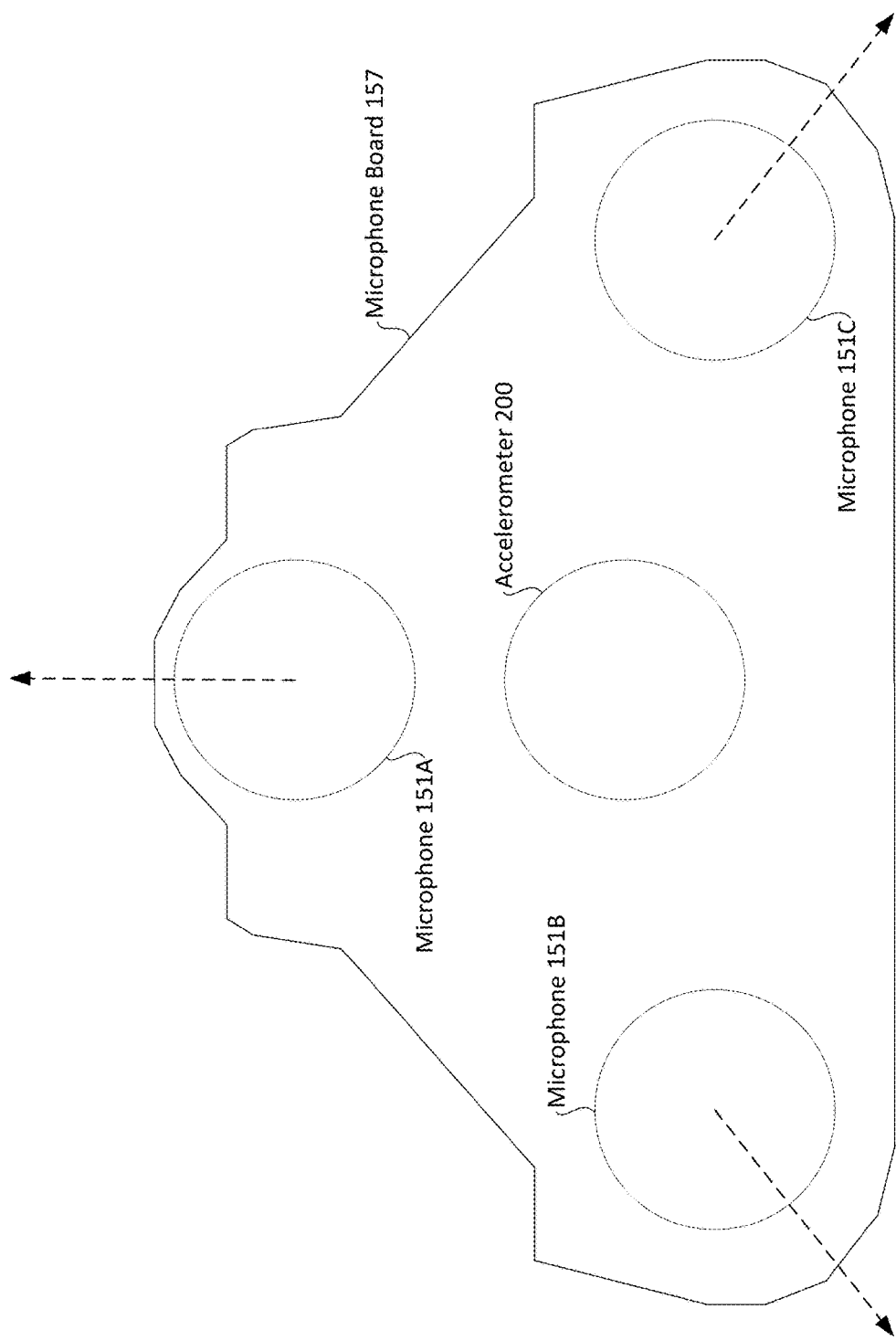
FIG. 3 depicts a diagram of microphones and an accelerometer, in accordance with an example embodiment.

FIG. 3 depicts a diagram of microphones and an accelerometer. In FIG. 3, the microphones 151A-151C and the accelerometer 200 are coupled to the microphone board 157. The accelerometer 200 is proximate to a center of the microphone board 157. The microphones 151A-151C are proximate to the edges of the microphone board 157. In the illustrative embodiment of FIG. 3, the microphone 151A is oriented in a first direction, the microphone 151B is oriented in a second direction that is 120 degrees from the first direction, and the microphone 151C is oriented in a third direction that is 120 degrees from the first direction and 120 degrees from the second direction.

Figure 4:
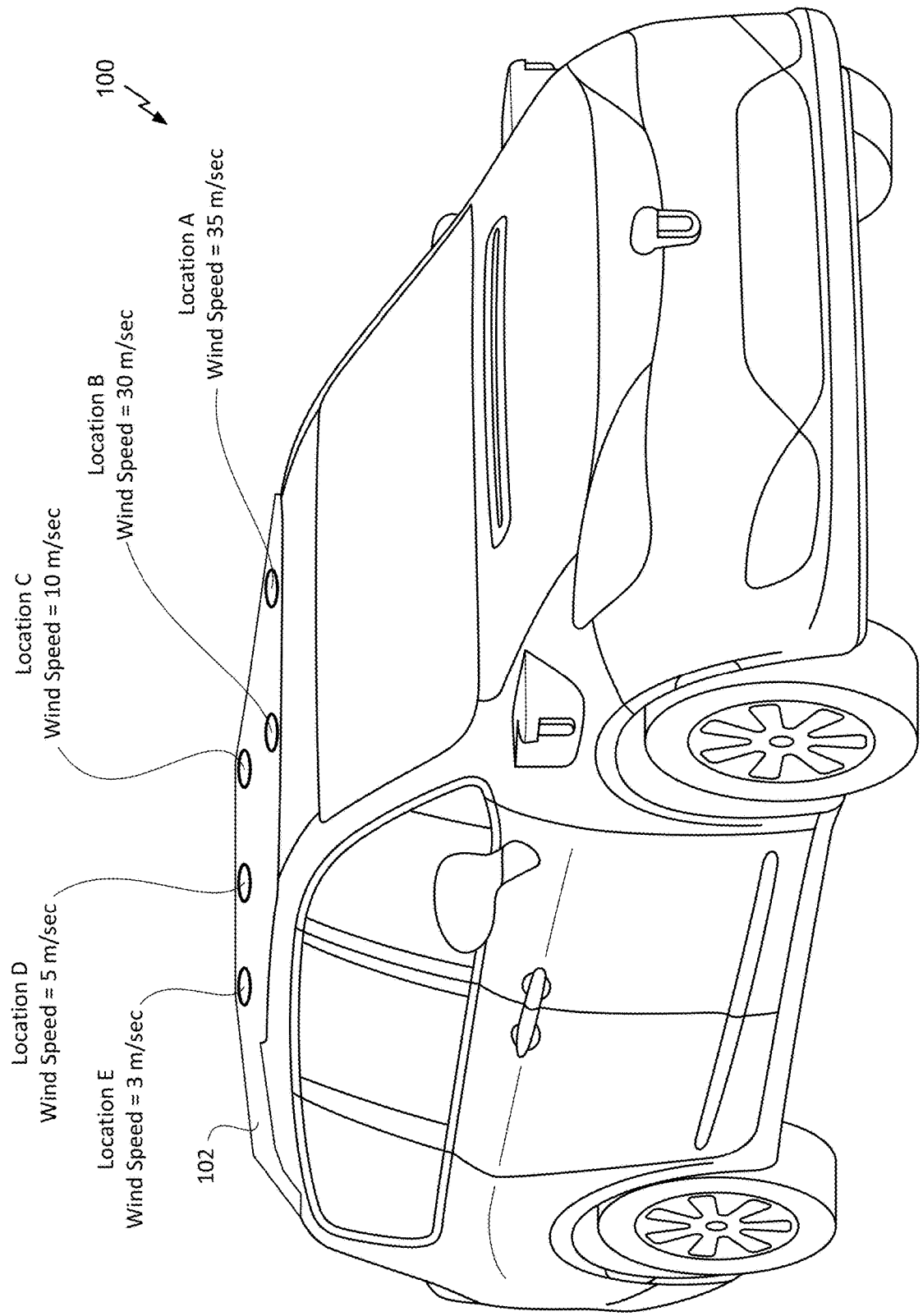
FIG. 4 depicts a diagram of different roof locations to couple a microphone unit, in accordance with example embodiments.

FIG. 4 depicts a diagram of different roof locations to couple a microphone unit in accordance with example embodiments. In FIG. 4, the roof 102 of the autonomous vehicle 100 is depicted. Different locations (e.g., Location A-Location E) on the roof 100 are depicted as potential places to couple microphone units, such as the microphone unit 150. It should be understood that the locations depicted in FIG. 4 are merely for illustrative purposes and should not be construed as limiting.

The locations for the microphone units can be determined based on detected wind speeds. For example, the microphone units can be coupled to the roof 102 at locations with a relatively low wind speed. Simulation data can be generated to detect the wind speeds at different locations. For example, during a simulation, sensors can be placed on the roof 102 of the autonomous vehicle 100 to detect the various wind speeds at different locations. According to the non-limiting illustrative example in FIG. 4, Location A has a wind speed of 35 meters per second (m/sec), Location B has a wind speed of 30 m/sec, Location C has a wind speed of 10 m/sec, Location D has a wind speed of 5 m/sec, and Location E has a wind speed of 3 m/sec. Thus, according to the non-limiting illustrative example in FIG. 4, Location E is a relatively good place to couple a microphone unit, Location D is the second best place to couple a microphone unit, Location C is the third best place to couple a microphone unit, Location B is the next best place to couple a microphone unit, and Location A is the worst place to couple a microphone unit.

It should be understood that selected locations for the microphone units can vary based on the structure of an autonomous vehicle. Thus, different models of autonomous vehicles can have different optimal locations for coupling the microphone units to the roof.

III. EXAMPLE METHODS

Figure 5:
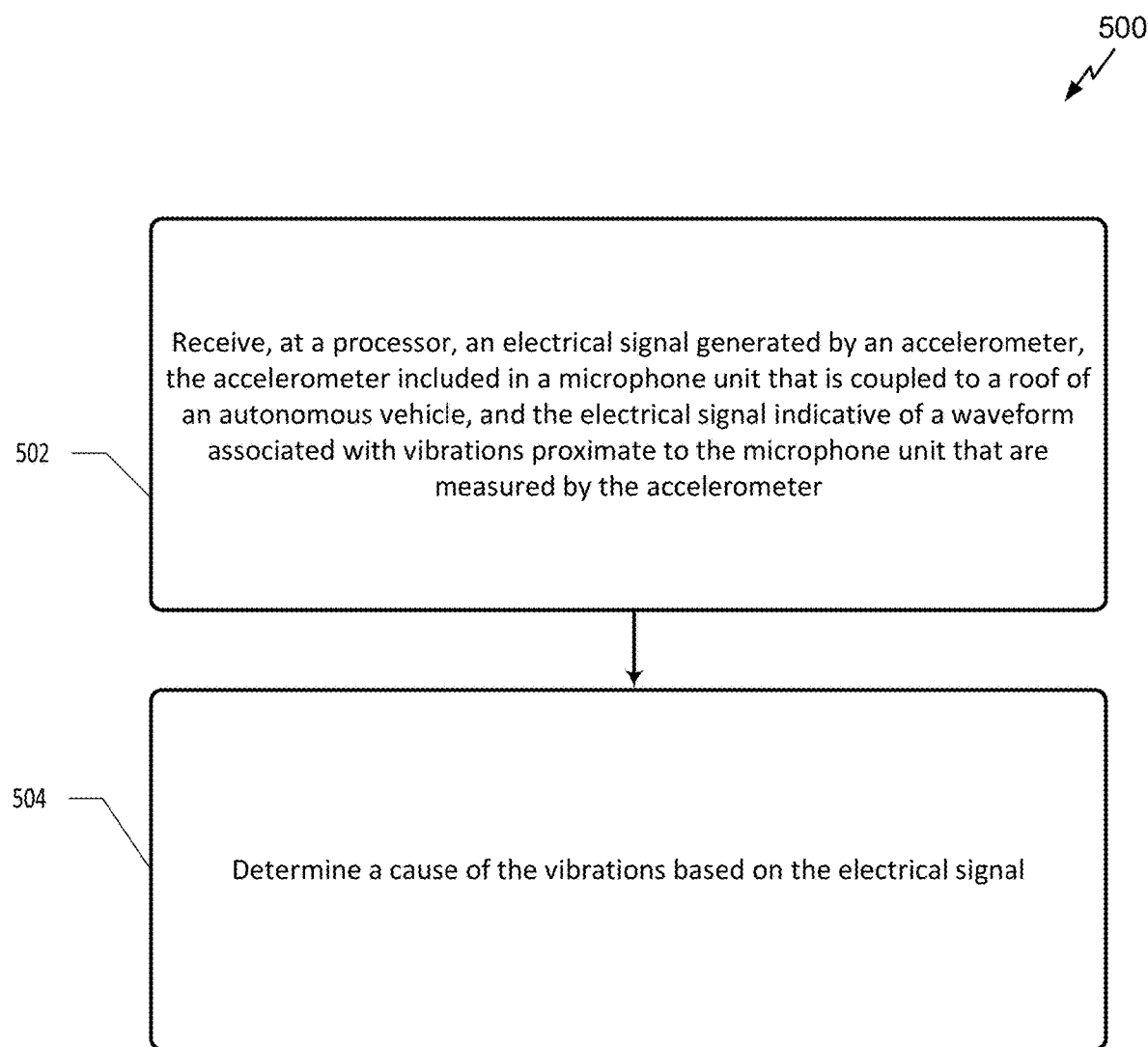
FIG. 5 is a flowchart of a method, according to an example embodiment.

FIG. 5 is a flowchart of a method 500 according to an example embodiment. The method 500 can be performed by the microphone unit 150 of FIG. 1 and the computing system 110 of FIG. 1.

The method 500 includes receiving, at a processor, an electrical signal generated by an accelerometer, at 502. The accelerometer is included in a microphone unit that is coupled to a roof of an autonomous vehicle, and the electrical signal is indicative of a waveform associated with vibrations proximate to the microphone unit that are measured by the accelerometer. For example, referring to FIG. 1, the processor 112 receives the electrical signal 262 generated by the accelerometer 200. The electrical signal 262 is indicative of the output voltage ($V_{out}$) waveform associated with the vibrations 260 proximate to the microphone unit 150 that are measured by the accelerometer 200.

The method 500 also includes determining a cause of the vibrations based on the electrical signal, at 504. For example, referring to FIG. 1, the accelerometer processing module 116 determines the cause of the vibrations 260 based on the electrical signal 262. According to one implementation, the cause of the vibrations 260 is low frequency sounds 190 external to the autonomous vehicle 100. For example, the low frequency sounds 190 can correspond to sirens.

According to one implementation of the method 500, determining the cause of the vibrations 260 includes monitoring the electrical signal 262 over a particular distance travelled by the autonomous vehicle 100. The method 500 can also include determining that the cause of the vibrations 260 is environmental noise in response to a determination that the electrical signal 262 indicates the waveform (e.g., the output voltage ($V_{out}$) waveform) is not substantially continuous over the particular distance travelled by the autonomous vehicle 100. The method 500 can also include determining that the cause of the vibrations 260 is a faulty connection associated with the autonomous vehicle 100 in response to a determination that the electrical signal 262 indicates the waveform (e.g., the output voltage ($V_{out}$) waveform) is substantially continuous over the particular distance travelled by the autonomous vehicle 100.

According to one implementation, the method 500 can include determining that the cause of the vibrations 260 is wind noise. In this implementation, the method 500 can also include generating the noise cancellation signal 192 based on the electrical signal 262 to substantially reduce the wind noise.

According to one implementation, the method 500 can include monitoring a signature associated with the accelerometer 200. The signature can be based on the vibrations 260. The method 500 can also include feeding the signature into a machine learning algorithm for early defect detection associated with the accelerometer 200. For example, the accelerometer processing module 116 can feed the signature into a machine learning algorithm to predict when the accelerometer 200 is susceptible to defects. Based on predictions, the computing system 110 can initiate a maintenance scheduling request for improved safety and reduced cost.

The method 500 of FIG. 5 enables low frequency sounds to be detected using the accelerometer 200 in the microphone unit 150 coupled to the roof 102 of the autonomous vehicle 100. As a result, the accelerometer 200 can detect wind noise, environmental noise, a faulty connection associated with the autonomous vehicle 100, etc.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
   a microphone unit coupled to a roof of an autonomous vehicle, the microphone unit comprising:
      a microphone board having a first opening;
      a first microphone positioned over the first opening and coupled to the microphone board; and
      an accelerometer, wherein the accelerometer measures vibrations proximate to the microphone unit and generates an electrical signal indicative of a waveform associated with the measured vibrations, and wherein the measured vibrations are caused by sounds external to the autonomous vehicle; and
   a processor coupled to the microphone unit.

2. The system of claim 1, wherein the processor is configured to determine audio characteristics of the sounds external to the autonomous vehicle based on the electrical signal in response to a determination that the first microphone is failing to detect the sounds external to the autonomous vehicle.

3. The system of claim 2, wherein the sounds external to the autonomous vehicle correspond to a siren.

4. The system of claim 1, wherein the measured vibrations are caused by wind noise, and wherein the processor is configured to generate a noise cancellation signal based on the electrical signal.

5. The system of claim 1, wherein the processor is configured to monitor the electrical signal over a particular distance travelled by the autonomous vehicle.

6. The system of claim 5, wherein the processor is configured to determine that the monitored vibrations are caused by environmental noise in response to a determination that the electrical signal indicates the waveform is not substantially continuous over the particular distance travelled by the autonomous vehicle.

7. The system of claim 1, wherein the microphone board has a second opening and a third opening, and wherein the microphone unit further comprises:
   a second microphone positioned over the second opening and coupled to the microphone board; and
   a third microphone positioned over the third opening and coupled to the microphone board.

8. The system of claim 7, wherein the first microphone, the second microphone, and the third microphone are proximate to an edge of the microphone board.

9. The system of claim 8, wherein the first microphone is oriented in a first direction, wherein the second microphone is oriented in a second direction that is 120 degrees from the first direction, and wherein the third microphone is oriented in a third direction that is 120 degrees from the first direction and 120 degrees from the second direction.

10. A method comprising:
    receiving, at a processor, an electrical signal generated by an accelerometer, the accelerometer included in a microphone unit that is coupled to a roof of an autonomous vehicle, and the electrical signal indicative of a waveform associated with vibrations measured by the accelerometer, wherein the measured vibrations are caused by sounds external to the autonomous vehicle; and
    determining a cause of the vibrations based on the electrical signal.

11. The method of claim 10, wherein determining the cause of the vibrations comprises:
    monitoring the electrical signal over a particular distance travelled by the autonomous vehicle; and
    determining that the cause of the vibrations is environmental noise in response to a determination that the electrical signal indicates the waveform is not substantially continuous over the particular distance travelled by the autonomous vehicle.

12. The method of claim 4, wherein the sounds external to the autonomous vehicle correspond to a siren.

13. The method of claim 10, further comprising:
    determining that the cause of the vibrations is wind noise; and
    generating a noise cancellation signal based on the electrical signal to substantially reduce the wind noise.

14. A non-transitory computer-readable medium having stored therein instructions executable by a computing device to cause the computing device to perform functions, the functions comprising:

receiving, at a processor, an electrical signal generated by an accelerometer, the accelerometer included in a microphone unit that is coupled to a roof of an autonomous vehicle, and the electrical signal indicative of a waveform associated with vibrations measured by the accelerometer, wherein the measured vibrations are caused by sounds external to the autonomous vehicle; and determining a cause of the vibrations based on the electrical signal.

15. The non-transitory computer-readable medium of claim 14, wherein the functions further comprise:

monitoring a signature associated with the accelerometer, the signature based on the vibrations;

feeding the signature into a machine learning algorithm.

* * * * *